J. E. PRESTON.
GALVANIC BATTERY.
APPLICATION FILED NOV. 12, 1910.
1,104,828.
Patented July 28, 1914.
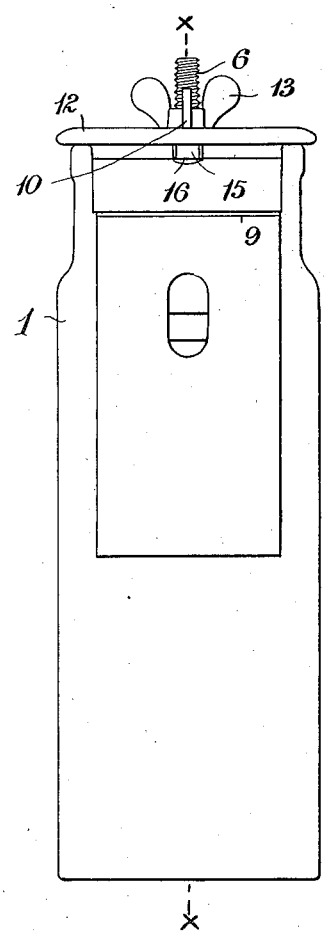
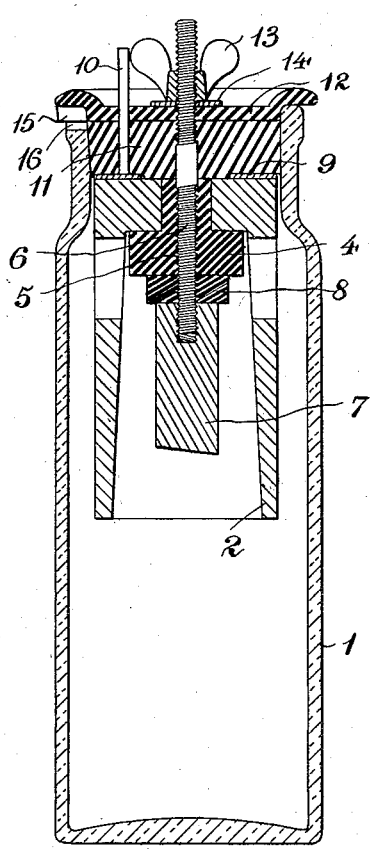
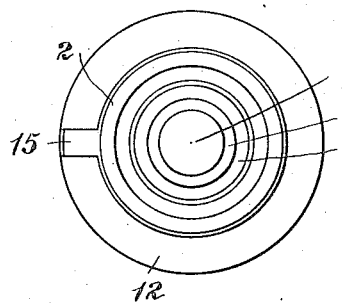
Witnesses:
L. W. Staader
A. Hoyer.
Inventor:
John Edward Preston

UNITED STATES PATENT OFFICE.

JOHN EDWARD PRESTON, OF STOCKPORT, ENGLAND.

GALVANIC BATTERY.

1,104,828. Specification of Letters Patent. Patented July 28, 1914.

Application filed November 12, 1910. Serial No. 591,976.

*To all whom it may concern:*

Be it known that I, JOHN EDWARD PRESTON, a subject of His Majesty the King of England, residing at 4 Dunham street, Stockport, Cheshire, England, have invented certain new and useful Improvements in Galvanic Batteries, of which the following is a specification.

This invention relates to improvements in galvanic batteries, and particularly those of the reversible type.

An object of the present invention is to provide means for sealing a galvanic cell so that all possibility of leakage of the liquid contained in the cell is eliminated; and also to insure a perfect insulation of the positive and negative elements of the cell, thereby preventing any local action taking place within the cell.

Another object of this invention is to enable the sealing to be readily broken, when desired, and the elements of the cell easily removed and replaced or renewed.

By and in accordance with the present invention there is provided a removable stopper unit for the containing vessel of a closed galvanic battery cell in which the cover plate, an elastic disk, and both positive and negative electrodes are combined as the stopper unit by a centrally disposed screw bolt which with means arranged on said bolt above the cover serves to confine all parts of the unit thereon as well as for screwing or drawing the parts together to put clamping pressure on the opposite faces of the elastic disk to produce by compression and radial flow of said elastic disk (*a*) a fluid tight sealing of the containing vessel and (*b*) a fluid tight jointing between the electrodes and their conductors; the clamping elements being constituted on the one side by the cover plate and on the other side by the positive and negative electrodes supported one around the other with appropriate interposition of insulating means. Thus with all the component parts of the stopper unit arranged detachable one from the other as well as bodily removable from the containing vessel as a unit, a simple drawing together of the clamping elements when the stopper unit is inserted in the container vessel serves to produce a fluid tight sealing of the containing vessel by a single seal, a fluid tight jointing between the electrodes and their conductors, an immovable binding together of the component parts of the electrode clamping element in relation one to the other and an immovable binding together of the whole of the component parts of the unit. Moreover, the electrodes comprising an element of fragility in the case of the carbon element thereof, a protection of this fragile element from direct shock is also realized.

In the accompanying drawings the invention is illustrated by way of example as applied to a single galvanic cell, Figure 1 being an elevation of the cell; Fig. 2 a sectional elevation taken on line *x x* Fig. 1, Fig. 3 an under plan view of the parts shown in Fig. 2 but with the cell removed, and Fig. 4 a view of a slight modification.

Similar letters refer to similar parts throughout the several views.

Referring to the drawings 1 is the cell which may be made of glass, or ebonite, or other suitable material capable of resisting the action of the electrolyte used, such for instance, as a lead-lined brass, iron or other metallic container. Suspended in the cell 1 by means hereinafter explained is the carbon or negative electrode 2, which may be of circular or any convenient shape in cross section, and, as shown, open at one end and closed at the other with the exception of a hole or opening 3. A flanged washer 4 of ebonite or other insulating material is placed in the cell 2, the smaller diameter of said washer 4 fitting into the hole 3 provided in the closed end of the cell 2. The washer 4 has a central hole 5 tapped to receive a correspondingly threaded metal rod or spindle 6 which passes therethrough. The rod 6 projects a short distance on the underside of the washer 4, and at its lower end, said rod 6 is screwed or otherwise attached to a zinc rod or positive electrode 7, an elastic washer 8 as of rubber being interposed between said electrode 7 and the washer 4.

A conducting ring 9 preferably made from sheet lead to which is suitably connected a terminal 10 for the negative electrode is placed on top of the carbon cell 2, said ring 9 being of course insulated from the rod 6 connected to the positive electrode 7. Over the rod 6 is then placed a disk 11 of rubber or other elastic non-conducting substance, the diameter of the disk being such that when placed in the opening in the neck of the cell 1 it preferably fits easily therein. The disk has an opening therein to allow the terminal 10 to pass therethrough. A cover plate 12, of ebonite or other suitable material, having one part slightly larger than the opening in the neck of the cell 1, is then placed over the rod 6; and rests upon the rubber disk 11. The rod or spindle 6 projects above the cover plate 12 and has a tightening nut 13 on said projecting portion, a washer 14 being preferably interposed between the said nut 13 and the cover plate 12. The projecting portion of the rod or spindle 6 forms a terminal for the positive electrode 7.

The cover plate 12 in certain cases will have a lip or tongue 15 engaging a recess 16 in a wall of the cell 1 so as to prevent any rotary movement of the cover plate 12 when tightening up the wing nut 13, and also, in the case of a combination of cells, to insure the contacts being in the correct position.

The cell above described is hermetically sealed as follows: All the above parts, with the exception of the cell, being mounted in their respective positions, and the cell 1 having been charged with the electrolyte, the carbon 2, rubber disk or plate 11 etc., are passed through the opening in the neck of the cell 1, until the cover plate 12 rests upon the top of the neck of said cell 1. The tightening nut 13 is then screwed down to such an extent that the rubber disk or plate 11 is compressed between the cover plate 12 and the top of the carbon 2. This will have the effect of causing the disk 11 to expand in every direction so that a perfect air and fluid tight sealing of the cell and the connections thereof is secured, since the expansion of the rubber disk 11 effects a perfect joint between itself and the container, between itself and the terminals 6 and 10, between the ebonite washer 4 and the top of the carbon cell 2, and between the conducting ring 9 and the rod 6. Also by expanding down between the inner circumferential wall of the ring 9 onto the carbon a perfect insulation between the electrodes 2 and 7 is obtained. At the same time the seal may at any time be quickly broken and the contents of the cell easily reached. It will also be observed that by reason of all the elements of the cell being connected together these can be quickly removed from the cell or container simultaneously.

Fig. 4 illustrates a slightly modified arrangement for connecting the positive and negative elements together. In this arrangement the flanged washer 4 has a plain central hole 17, in lieu of a tapped hole as shown in Fig. 1. The lower end of the metal rod 6 is left quite plain except where it engages with the positive element if such engagement is by means of a screw. The flanged washer 4 is adapted as by a screw thread formed thereon to be secured to a supporting or carrying, and preferably vulcanite, ring 18, located between the conducting ring 9 and the sealing disk 11. It will thus be seen that when a new positive element 7 is required, all that is necessary to be done, after removal of the elements from the cell, is to unscrew the thumb nut 13 from the rod 6, when the positive element 7 and the rod 6 can be at once detached from the negative element, by axial movement of one element with relation to the other.

It will be obvious that a cell or cells constructed under the invention, may be arranged in any combination of connections with any well known arrangement of contacts.

Having thus described my invention, what I claim as new and desire to secure by Letters Patent of the United States of America is:—

1. In combination as a removable stopper unit for the containing vessel of a closed galvanic battery cell, a screw bolt, insulated positive and negative elements mounted thereon one within the other to form one element of a clamp, conducting means connected to said electrodes, an elastic disk fitted over said bolt above said clamp element, a cover plate on said bolt surmounting the disk and forming the complementary clamp element, and means arranged on said bolt above said cover plate for confining all parts of the unit thereon and for screwing the clamping elements towards one another to put clamping pressure on the opposite faces of said elastic disk to produce by compression and radial flow of said elastic disk (a) a fluid tight sealing of the containing vessel and (b) a fluid tight jointing between the electrodes and their conductors substantially as described.

2. In combination as a removable stopper unit for the containing vessel of a closed galvanic battery cell, a screw bolt, insulated positive and negative elements mounted thereon one within the other to form one element of a clamp, conducting means connected to said electrodes with the component parts of said clamping element arranged to be immovably bound in relation one to the other under clamping pressure, an elastic disk fitted over said bolt above said clamp element, a cover plate on said bolt surmounting the disk and forming the complementary clamp element, and means arranged on said bolt above said cover plate for confining all parts of the unit thereon and for screwing the clamping elements towards one another to bind all the component parts of the unit immovably together and to put clamping pressure on the opposite faces of said elastic disk to produce by compression and radial flow of said elastic disk (a) a fluid tight sealing of the containing vessel and (b) a fluid tight jointing between the electrodes and their conductors substantially as described.

3. In combination as a removable stopper unit for the containing vessel of a closed galvanic battery cell, a screw bolt, positive and negative electrodes mounted thereon one within the other, conducting means connected to said electrodes, an insulating member on said bolt insulating the electrodes and supporting the outside electrode, said electrodes and insulating member co-acting to form one element of a clamp, an elastic disk fitted over said bolt above said clamping element, a cover plate on said bolt surrounding the disk and forming the complementary clamping element, and a nut upon the end of said bolt projecting from the cover plate for confining all parts of the unit thereon, and for drawing the clamping elements towards one another to bind all the component parts of the unit immovably together and to put clamping pressure on the opposite faces of said elastic disk to produce by compression and radial flow of said elastic disk (a) a fluid tight sealing of the containing vessel and (b) a fluid tight jointing between the electrodes and their conductors substantially as described.

4. In combination as a removable stopper unit for the containing vessel of a closed galvanic battery cell, a screw bolt, positive and negative electrodes mounted thereon one within the other a flanged insulating member on said bolt insulating the electrodes and supporting the outside and correspondingly flanged electrode, said electrodes and insulating member co-acting to form one element of a clamp, an elastic disk fitted over said bolt above said clamping element, a cover plate on said bolt surrounding the disk and forming the complementary clamping element, a conducting plate on the flanged end of the outside electrode and having a terminal passing through said disk and cover plate the aforesaid screw bolt forming also the terminal for the inside electrode, and a nut upon the end of said bolt projecting from the cover plate for confining all parts of the unit thereon, and for drawing the clamping elements towards one another to bind all the component parts of the unit immovably together and to put clamping pressure on the opposite faces of said elastic disk to produce by compression and radial flow of said elastic disk (a) a fluid tight sealing of the containing vessel and (b) a fluid tight jointing between the electrodes and their conductors substantially as described.

5. In combination as a removable stopper unit for the containing vessel of a closed galvanic battery cell, a screw bolt, positive and negative electrodes mounted thereon one within the other, a flanged insulating member on said bolt insulating the electrodes and supporting the outside and correspondingly flanged electrode, said electrodes and insulating member co-acting to form one element of a clamp, an elastic washer interposed between said inside electrode and said insulating member, an elastic disk fitted over said bolt above said clamping element, a cover plate on said bolt surrounding the disk and forming the complementary clamping element, a conducting plate on the flanged end of the outside electrode and having a terminal passing through said disk and cover plate the aforesaid screw bolt forming also the terminal for the inside electrode, and a nut upon the end of said bolt projecting from the cover plate for confining all parts of the unit thereon, and for drawing the clamping elements towards one another to bind all the component parts of the unit immovably together and to put clamping pressure on the opposite faces of said elastic disk to produce (a) a fluid tight sealing of the containing vessel and (b) a fluid tight jointing between the electrodes and their conductors substantially as described.

6. In combination as a removable stopper unit for the containing vessel of a closed galvanic battery cell, a cover plate and negative and positive electrodes carried thereby, a screw threaded pin passing centrally through the cover plate and having a wing nut thereon, an electrode and a flanged washer of insulating material secured onto the lower end of such pin, a resilient member disposed between such washer and electrode, a cylindrical flanged electrode resting upon the flanged washer and located concentrically with the first mentioned electrode, a conducting ring upon the upper end of the cylindrical electrode, an insulating ring above such ring and around said flanged insulating washer, a resilient disk located around the aforesaid pin and between the cover plate and the latter insulating ring and washer and a terminal passing from such conducting ring through the resilient disk and cover plate, substantially as and for the purpose herein described.

In testimony whereof I affix my signature in presence of two witnesses.

JOHN EDWARD PRESTON.

Witnesses:
A. T. BARNES,
L. COULSON.